United States Patent
Li et al.

(10) Patent No.: US 9,804,738 B2
(45) Date of Patent: Oct. 31, 2017

(54) ICON SORTING AND DISPLAYING METHOD AND TERMINAL DEVICE

(71) Applicant: HUAWEI DEVICE CO., LTD., Shenzhen (CN)

(72) Inventors: Changzhu Li, Shenzhen (CN); Yahui Wang, Beijing (CN); Lei Wang, Beijing (CN); Wenmei Gao, Beijing (CN); Shunan Fan, Beijing (CN); Xiaoqiang Lv, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 322 days.

(21) Appl. No.: 14/579,236

(22) Filed: Dec. 22, 2014

(65) Prior Publication Data

US 2015/0113457 A1   Apr. 23, 2015

Related U.S. Application Data (63) Continuation of application No. PCT/CN2013/078358, filed on Jun. 28, 2013.

(30) Foreign Application Priority Data

Sep. 11, 2012 (CN) .......................... 2012 1 0334362

(51) Int. Cl.
*G06F 3/0481* (2013.01)
*G06F 3/0482* (2013.01)
(Continued)

(52) U.S. Cl.
CPC ........ *G06F 3/04817* (2013.01); *G06F 3/0482* (2013.01); *G06F 3/0488* (2013.01); *G06F 9/4443* (2013.01)

(58) Field of Classification Search
CPC .. G06F 3/04817; G06F 9/4443; G06F 3/0488; G06F 3/0482
(Continued)

(56) References Cited

U.S. PATENT DOCUMENTS

2007/0247642 A1  10/2007  Nakamura et al.
2008/0189658 A1   8/2008  Jeong et al.
(Continued)

FOREIGN PATENT DOCUMENTS

CN    101060579    10/2007
CN    101241413     8/2008
(Continued)

OTHER PUBLICATIONS

Extended European Search Report dated Oct. 15, 2015 in corresponding European Patent Application No. 13837630.6.
(Continued)

*Primary Examiner* — Jennifer To
*Assistant Examiner* — John Repsher, III
(74) *Attorney, Agent, or Firm* — Staas & Halsey LLP (57) ABSTRACT

Embodiments of the present invention relate to the communications field and provide an icon sorting and displaying method, which can perform sorting according to both icon types and frequency of use so as to simplify user operations of searching for and selecting a frequently used icon. The method includes: sorting icons by type along a first direction; sorting icons of a same type by frequency of use along a second direction; and displaying the sorted icons on a screen. The embodiments of the present invention further provide a corresponding terminal device.

14 Claims, 7 Drawing Sheets

(51) Int. Cl.
*G06F 3/0488* (2013.01)
*G06F 9/44* (2006.01)

(58) Field of Classification Search
USPC .......................................................... 715/765
See application file for complete search history.

(56) References Cited

U.S. PATENT DOCUMENTS

| | | | |
|---|---|---|---|
| 2010/0285785 A1* | 11/2010 | Wang | G06F 1/165 |
| | | | 455/418 |
| 2011/0138328 A1 | 6/2011 | Ge | |
| 2011/0219302 A1* | 9/2011 | Kondo | G06F 3/0416 |
| | | | 715/702 |
| 2011/0252383 A1* | 10/2011 | Miyashita | G06F 3/0482 |
| | | | 715/863 |
| 2012/0062599 A1 | 3/2012 | Machida | |
| 2013/0024815 A1* | 1/2013 | O | H04M 1/72586 |
| | | | 715/811 |
| 2013/0219335 A1 | 8/2013 | Zhang | |
| 2013/0268895 A1 | 10/2013 | Yamaki et al. | |

FOREIGN PATENT DOCUMENTS

| | | |
|---|---|---|
| CN | 101344833 | 1/2009 |
| CN | 101937311 | 1/2011 |
| CN | 101944000 | 1/2011 |
| CN | 102073453 | 5/2011 |
| CN | 102087575 | 6/2011 |
| CN | 102609210 | 7/2012 |
| JP | 2000-305695 | 11/2000 |
| WO | 2012/101885 A1 | 8/2012 |

OTHER PUBLICATIONS

Chinese Office Action dated Jan. 18, 2016 in corresponding Chinese Patent Application No. 201210334362.5.
PCT International Search Report dated Oct. 3, 2013 in corresponding International Patent Application No. PCT/CN2013/078358.
International Search Report mailed Oct. 3, 2013, in corresponding International Patent Application No. PCT/CN2013/078358.

* cited by examiner

ICON SORTING AND DISPLAYING METHOD AND TERMINAL DEVICE

CROSS-REFERENCE TO RELATED APPLICATIONS

This application is a continuation of International Application No. PCT/CN2013/078358, filed on Jun. 28, 2013, which claims priority to Chinese Patent Application No. 201210334362.5, filed on Sep. 11, 2012, both of which are incorporated herein by reference in their entireties.

TECHNICAL FIELD

The present invention relates to the communications field, and in particular, to an icon sorting and displaying method and a terminal device.

BACKGROUND

With continuous improvement of performance and storage capacity of an intelligent terminal, a user downloads and installs increasingly more applications. A main menu usually includes a large number of application icons. However, a screen size of a terminal device restricts the amount of information that can be viewed at a time, and the icons have to be displayed on multiple pages. Therefore, every time when the user selects an icon, the user needs to search a window carefully or even switch the screen from one to another. Operations are cumbersome, time-consuming and laborious, and very inconvenient for the user to quickly find a desired and frequently used icon.

Currently, an intelligent terminal device generally displays icons in a fixed arrangement order, and supports a search and a manual operation of a user. However, to perform the search, the user usually needs to remember a display name of an icon, which is inconvenient to use for the user. The user can customize addition, deletion, and a display location (sorted by dragging manually) of the icons, use folders to categorize the icons, and copy an icon onto an eye-catching home screen or a preset window for ease of search. However, such operations are very cumbersome. If the users preference keeps changing, a previous setting needs to be changed in time, which is also inconvenient. Consequently, after new applications are added continuously over time, a large number of disordered icons may exist in the menu, which is very inconvenient for the user to search for and select a frequently used icon.

SUMMARY

Embodiments of the present invention provide an icon sorting and displaying method and a terminal device, which can perform sorting according to both icon types and frequency of use so as to simplify user operations of searching for and selecting a frequently used icon.

To achieve the foregoing purposes, the following technical solutions are adopted in the embodiments of the present invention:

According to a first aspect of the present invention, an icon sorting and displaying method is provided, including:
sorting icons by type along a first direction;
sorting icons of a same type by frequency of use along a second direction; and
displaying the sorted icons on a screen.

In a first possible implementation manner of the first aspect, the sorting icons of a same type by frequency of use along a second direction includes:
calculating a value of frequency of use of each icon of a same type; and
sorting each icon of the same type according to the calculated value of frequency of use along the second direction.

With reference to the first possible implementation manner of the first aspect, in a second possible implementation manner, the calculating a value of frequency of use of each icon of a same type includes:
recording the number of times of using each icon of the same type within a preset time and duration of use each time; and
calculating the value of frequency of use of each icon according to the recorded number of times of use and duration of use each time.

In a third possible implementation manner of the first aspect, the sorting icons by type along a first direction includes:
calculating an overall frequency value of each type of icon; and
sorting each type of icon according to the calculated overall frequency value along the first direction.

With reference to the third possible implementation manner of the first aspect, in a fourth possible implementation manner, the calculating an overall frequency value of each type of icon includes:
recording the number of icons of a same type and a value of frequency of use of each icon; and
calculating the overall frequency value of each type of icon according to the recorded number of icons and the value of frequency of use of each icon.

In a fifth possible implementation manner of the first aspect, the method further includes:
dividing a display area of the screen into multiple independent touch control areas according to icon types;
receiving a touch input of a user;
determining a touch control area and a flick direction that are corresponding to the touch input;
moving icons according to the determined touch control area or flick direction or both, where:
moving the icons successively along the first direction when the flick direction is the first direction; and
moving, when the flick direction is the second direction, the icons of the type to which the determined touch control area belongs successively along the second direction and at the same time keeping other types of icons unchanged.

With reference to the fifth possible implementation manner of the first aspect, in a sixth possible implementation manner, the touch input of the user is a single-touch input or a multi-touch input.

With reference to the fifth possible implementation manner of the first aspect or the sixth possible implementation manner of the first aspect, in a seventh possible implementation manner, the method further includes:
arranging all icons in the determined touch control area into a cyclic queue by making them adjacent to each other; and
the moving icons according to the determined touch control area or flick direction or both includes:
moving the icons in the cyclic queue by means of a three-dimensional rotation effect according to the determined touch control area or flick direction or both.

With reference to the seventh possible implementation manner of the first aspect, in an eighth possible implementation manner, the method further includes:

receiving a reset instruction input by the user; and resetting the icons according to the reset instruction, where the reset instruction includes a type reset instruction that is used to reset one type of icon, and an entire-screen reset instruction that is used to reset all the icons.

According to a second aspect of the present invention, a terminal device is provided, including:

a processing unit, configured to sort icons by type along a first direction, and sort icons of a same type by frequency of use along a second direction; and a displaying unit, configured to display on a screen the icons sorted by the processing unit.

In a first possible implementation manner of the second aspect, the processing unit includes:

a first calculating module, configured to calculate a value of frequency of use of each icon of a same type; and a first sorting module, configured to sort each icon of the same type according to the calculated value of frequency of use along the second direction.

With reference to the first possible implementation manner of the second aspect, in a second possible implementation manner, the first calculating module is configured to:

record the number of times of using each icon of the same type within a preset time and duration of use each time; and calculate the value of frequency of use of each icon according to the recorded number of times of use and duration of use each time.

In a third possible implementation manner of the second aspect, the processing unit includes:

a second calculating module, configured to calculate an overall frequency value of each type of icon; and a second sorting module, configured to sort each type of icon according to the calculated overall frequency value along the first direction.

With reference to the third possible implementation manner of the second aspect, in a fourth possible implementation manner, the second calculating module is configured to:

record the number of icons of a same type and a value of frequency of use of each icon; and calculate the overall frequency value of each type of icon according to the recorded number of icons and the value of frequency of use of each icon.

In a fifth possible implementation manner of the second aspect, the terminal device further includes:

a touch control unit, configured to divide a display area of the screen into multiple independent touch control areas according to icon types, receive a touch input of a user, determine a touch control area and a flick direction that are corresponding to the touch input, and move icons according to the determined touch control area or flick direction or both, where:

move the icons successively along the first direction when the flick direction is the first direction; and move, when the flick direction is the second direction, the icons of the type to which the determined touch control area belongs successively along the second direction and at the same time keep other types of icons unchanged.

With reference to the fifth possible implementation manner of the second aspect, in a sixth possible implementation manner, the touch input of the user is a single-touch input or a multi-touch input.

With reference to the fifth possible implementation manner of the second aspect or the sixth possible implementation manner of the second aspect, in a seventh possible implementation manner, the touch control unit is further configured to:

arrange all icons in the determined touch control area into a cyclic queue by making them adjacent to each other; and move the icons in the cyclic queue by means of a three-dimensional rotation effect according to the determined touch control area or flick direction or both.

With reference to the seventh possible implementation manner of the second aspect, in an eighth possible implementation manner, the touch control unit is further configured to receive a reset instruction input by the user; and the processing unit is configured to reset the icons according to the reset instruction, where the reset instruction includes a type reset instruction that is used to reset one type of icon, and an entire-screen reset instruction that is used to reset all the icons.

After the foregoing technical solutions are adopted, in an icon sorting method and a terminal device provided in the embodiments of the present invention, icons are sorted by type along a first direction, and icons of a same type are sorted by frequency of use along a second direction, so that the icons can be separately sorted in two different directions, which is equivalent to two search clues. In this way, the icons can be searched for in one direction by type, and at the same time the icons of the same type can be searched for in another direction by frequency of use. In this way, the two aspects are performed at the same time, thereby simplifying user operations of searching for and selecting an icon and enabling a user to find a frequently used icon more quickly.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are only a part rather than all of the embodiments of the present invention. All other embodiments obtained by a person of ordinary skill in the art based on the embodiments of the present invention without creative efforts shall fall within the protection scope of the present invention.

Figure 1:
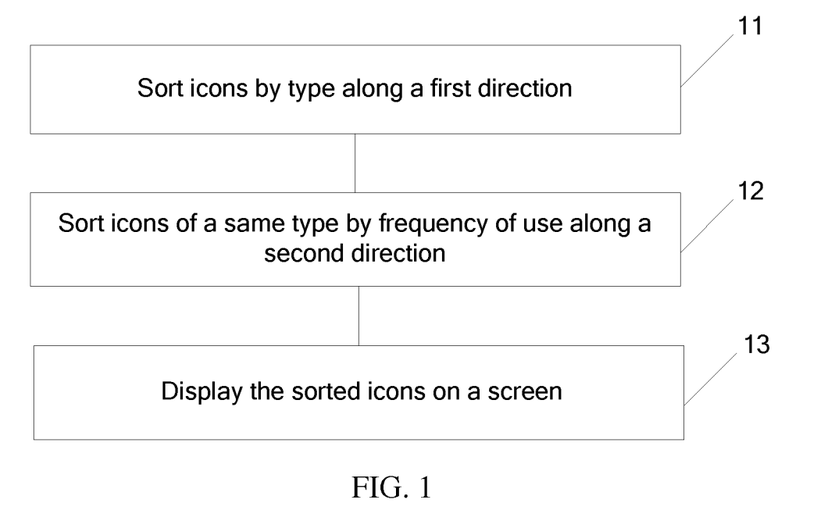
FIG. 1 is a flowchart of an icon sorting and displaying method according to an embodiment of the present invention.

FIG. 1 is a flowchart of an icon sorting and displaying method according to an embodiment of the present invention. Referring to FIG. 1, an embodiment of the present invention provides an icon sorting and displaying method, where the method may include:

11. Sort icons by type along a first direction.

12. Sort icons of a same type by frequency of use along a second direction.

13. Display the sorted icons on a screen.

In this embodiment of the present invention, the first direction and the second direction are different, but both may be horizontal directions, vertical directions, or other directions selected according to a requirement. For example, the first direction is a horizontal direction of the screen, and the second direction is a vertical direction of the screen; for another example, the first direction is a vertical direction of the screen, and the second direction is a horizontal direction of the screen, and so on. The present invention does not restrict the first direction or the second direction, and the directions may be selected and set according to a requirement.

It is hereby pointed out that step 11 and step 12 in the foregoing method are not necessarily performed in the foregoing order. That is, step 11 may be performed first and then step 12 is performed; and certainly step 12 may also be performed first and then step 11 is performed. The following gives further description by using an example in which step 12 is performed first and then step 11 is performed.

In step 12, the sorting icons of a same type by frequency of use along a second direction may include:

calculating a value of frequency of use of each icon of a same type; and sorting each icon of the same type according to the calculated value of frequency of use along the second direction.

In this embodiment of the present invention, the value of frequency of use of each icon of the same type may be calculated by using various manners. One manner of calculating the value of frequency of use of each icon of the same type may include: recording the number of times of using each icon of the same type within a preset time and duration of use each time; and calculating the value of frequency of use of each icon according to the recorded number of times of use and duration of use each time. Certainly, in addition to the foregoing manner, other manners that can be easily figured out by a person skilled in the art may further be used to calculate the value of frequency of use of each icon of the same type.

In step 11, the sorting icons by type along a first direction may include:

calculating an overall frequency value of each type of icon; and sorting each type of icon according to the calculated overall frequency value along the first direction.

In this embodiment of the present invention, the overall frequency value of each type of icon may be calculated by using various manners. One manner of calculating the overall frequency value of each type of icon may include: determining the number of icons of a same type and a value of frequency of use of each icon; and calculating the overall frequency value of each type of icon according to the determined number of icons and the value of frequency of use of each icon. In addition, other manners that can be easily figured out by a person skilled in the art may also be used to calculate the overall frequency value of each type of icon.

In a icon sorting and displaying method according to this embodiment of the present invention, icons are sorted by type along a first direction, and icons of a same type are sorted by frequency of use along a second direction, so that the icons can be separately sorted in two different directions, which is equivalent to two search clues. In this way, the icons can be searched for in one direction by type, and at the same time the icons of the same type can be searched for in another direction by frequency of use. In this way, the two aspects are performed at the same time, thereby simplifying user operations of searching for and selecting an icon and enabling a user to find a frequently used icon more quickly.

For better understanding of the present invention, the following further describes the present invention by using several specific embodiments as examples. The following specific embodiments are described by using an example in which a first direction is a vertical direction and a second direction is a horizontal direction (that is, different rows display different types, and a same row displays a same type). It is also noteworthy that the following enumerated embodiments are merely some embodiments of the present invention, and all other embodiments that can be easily figured out by a person of ordinary skill in the art from the content of the present invention shall fall within the protection scope of the present invention.

Embodiment 1

Figure 2:
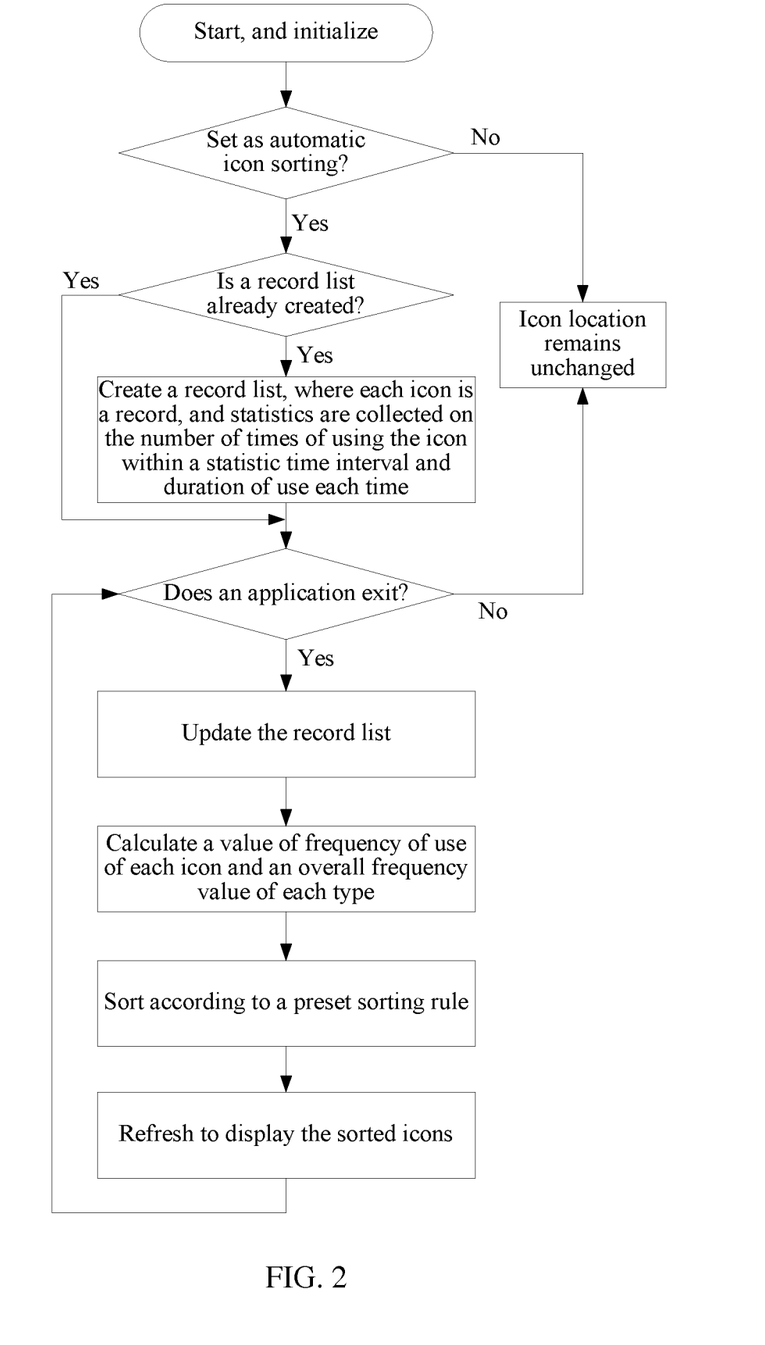
FIG. 2 is a specific flowchart of an icon sorting and displaying method.

This embodiment provides an icon sorting and displaying method, where the method may include:

receiving various parameters input by a user, where the parameters include a statistic time interval parameter, a weighting parameter, and the like, where default values of the parameters apply when no input setting is performed by the user for the parameters, and the default values may be preset;

creating a record list, where each icon is a record, and in the record, statistics is collected on the number of times of using the icon within a statistic time interval and duration of use each time;

using the following formula to calculate a value of frequency of use of each icon of a same type according to the recorded number of times of using each icon of the same type and duration of use each time:

$$A_k = \alpha * \frac{\text{number of times of using icon } k}{\text{number of times of using all icons}} + \beta * \frac{\text{duration of using icon } k}{\text{duration of using all icons}}$$

where, A represents a value of frequency of use of an icon, k represents a sequence number of the icon, $A_k$ represents a value of frequency of use of the kth icon, α is a weighting parameter whose value range is [0, 1], and β is a weighting parameter whose value range is [0, 1], and α+β=1;

arranging each icon of the same type in a same row according to the calculated value of frequency of use, where the arrangement direction may be from left to right in ascending or descending order of the value of frequency;

using the following formula to calculate an overall frequency value of each type of icon according to the determined number of icons and the value of frequency of use of each icon:

$$B_i = \gamma * \frac{\text{number of icons of type 1}}{\text{number of all icons}} + \delta * \sum_{k=1}^{N_1} A_k$$

where, B represents an overall frequency value of each type of icon, i represents a sequence number of an icon type, $B_i$ represents an overall frequency value of the ith icon type, N represents the number of icons of each icon type, γ is a weighting parameter whose value range is [0, 1], and δ is a weighting parameter whose value range is [0, 1], and γ+δ=1;

arranging each type of icon in different rows according to the overall frequency value along a vertical direction, where the arrangement direction may be from top to bottom in ascending or descending order of the overall frequency value; and displaying the sorted icons on a screen after completion of the sorting. Referring to FIG. 2, a specific icon sorting and displaying method may be shown in FIG. 2.

When the number of icons of a specific type is greater than an upper limit of icons that can be displayed in each row, remaining icons may be displayed in a next row automatically.

In addition, to restore the icons to an initial state after pages are switched for many times, this embodiment of the present invention may add a reset function. Therefore, optionally, the icon sorting and displaying method provided in this embodiment may further include:

receiving a reset instruction input by a user; and resetting icons according to the reset instruction, where the reset instruction includes a type reset instruction that is used to reset one type of icon, and an entire-screen reset instruction that is used to reset all the icons.

Specifically, when the type reset instruction input by the user is received, all icons of the type specified in the type reset instruction are reset; and, when the entire-screen reset instruction input by the user is received, all icons on a screen are reset.

With reference to accompanying drawings, the following describes a display effect after the solution of the present invention is applied.

Figure 3:
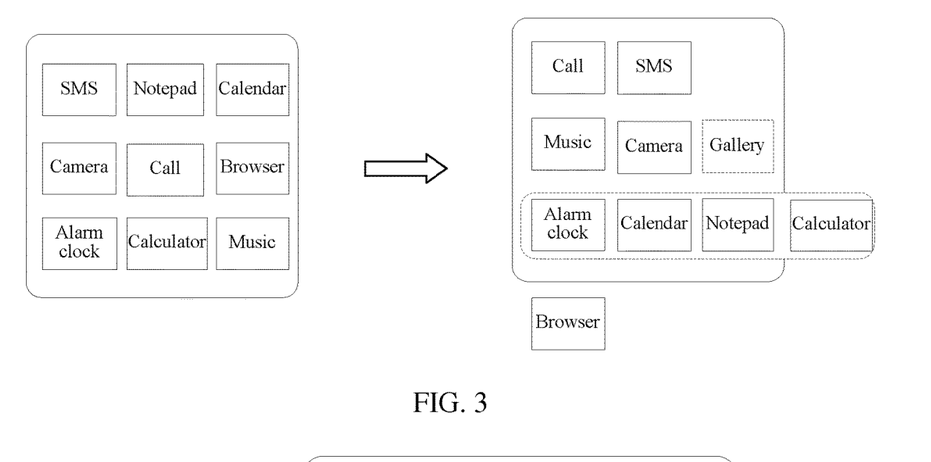
FIG. 3 is a before-sorting and after-sorting comparison chart of icons.

As shown in FIG. 3, the left side of FIG. 3 is a page of icons that are normally displayed in an intelligent terminal, and, an effect after the solution of the present invention is applied for sorting is shown on the right side of the figure. Icons of a same type are displayed in a same row. Specifically, in FIG. 3, "Call" and "SMS" belong to a communications type; "Gallery" that is originally displayed on another page is aggregated into a multimedia type and thus displayed on the first page; because tool-type icons are excessive and cannot be displayed on the first page, "Calculator" is displayed on the second page (displayed on the right side of FIG. 3); and a network-type icon "Browser" is displayed on a next page. After the icons are categorized by row, all icons of a specific type can be browsed by flicking transversely. Icons in a same row are sorted by frequency of use, and more icons are sorted by analogy.

When a user enters an icon window and wants to search for a specific icon, such as "Calculator", first, the user checks whether the icon to be searched for is on a current screen; if the icon to be searched for is on the current screen, the user directly taps the icon to access the application; and, if the icon to be searched for is not on the current screen, the user first determines a type of the icon to be searched for (that is, "Calculator"), such as a "Tool" type, and then may directly perform a flick operation for icons of the "Tool" type until the "Calculator" icon is found. The icon flick operation may be completed by performing a touch operation, and certainly may also be completed by performing a conventional keystroke operation (for example, the icon is flicked by pressing a physical direction key).

In a icon sorting and displaying method according to this embodiment, icons are sorted by type along a first direction, and at the same time icons of a same type are sorted by frequency of use along a second direction, so that the icons can be separately sorted in two different directions, which is equivalent to two search clues. In this way, the icons can be searched for in one direction by type, and at the same time the icons of the same type can be searched for in another direction by frequency of use. In this way, the two aspects are performed at the same time, thereby simplifying user operations of searching for and selecting an icon and enabling a user to find a frequently used icon more quickly.

Embodiment 2

On the basis of Embodiment 1, this embodiment further adds a function to support touch control. In this case, an icon sorting and displaying method provided in this embodiment further includes the following in addition to all steps in Embodiment 1:

dividing a display area of a screen into multiple independent touch control areas according to icon types;

receiving a touch input of a user;

determining a touch control area and a flick direction that are corresponding to the touch input;

moving icons according to the determined touch control area or flick direction or both, where:

moving the icons successively along the first direction when the flick direction is the first direction; and moving, when the flick direction is the second direction, the icons of the type to which the determined touch control area belongs successively along the second direction and at the same time keeping other types of icons unchanged.

Specifically, in this embodiment, the touch control areas are divided according to rows, and icons in a same row belong to one independent touch control area. After a touch control function is enabled, a terminal device detects a touch control area (area 1, 2, . . . , according to rows) in which a touch point (touch input) is located, and a flick direction and a speed of the touch point, and refreshes the display icons correspondingly according to the flick direction and the speed. When the touch input of the user is a single-touch input, only icons in a single touch control area move; and, when the touch input of the user is a multi-touch input, icons in multiple touch control areas may move.

The following gives description with reference to accompanying drawings.

Figure 4A:
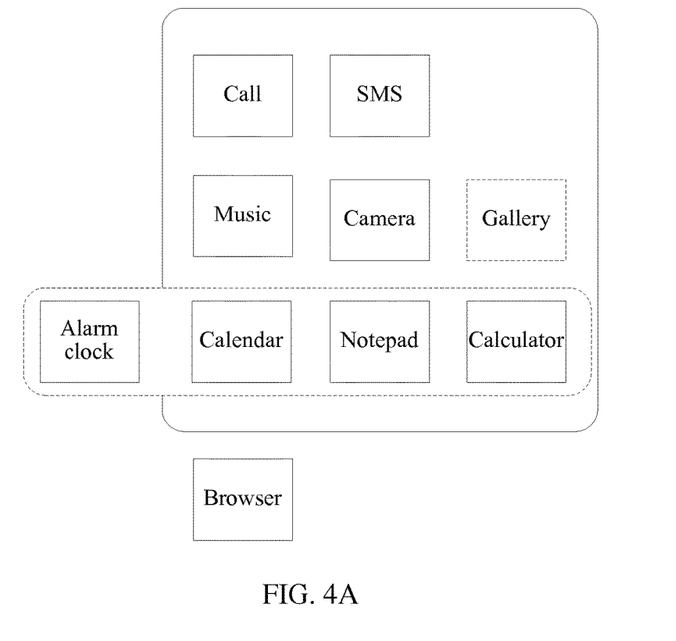
FIG. 4A is a schematic diagram of moving an icon leftward/rightward in a single-touch manner in an icon sorting and displaying method according to an embodiment of the present invention.
Figure 4B:
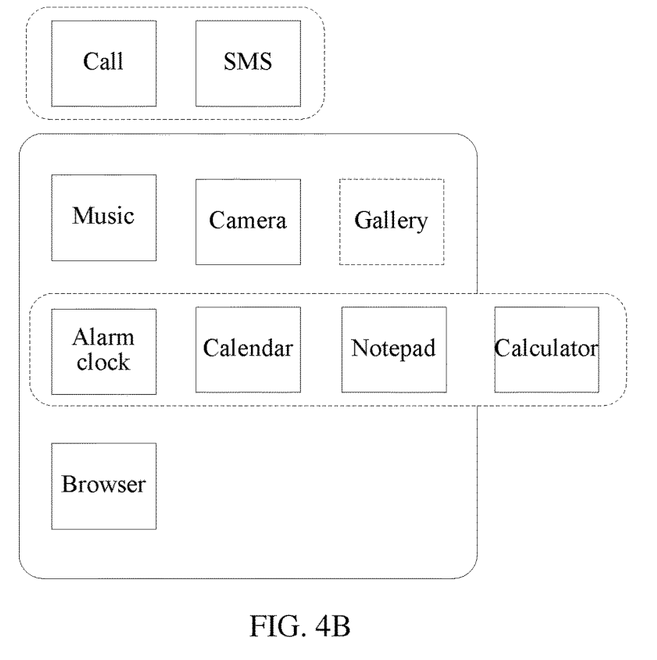
FIG. 4B is a schematic diagram of moving an icon up/down in a single-touch manner in an icon sorting and displaying method according to an embodiment of the present invention.

When a user enters an icon window and wants to search for a specific icon, such as "Calculator", first, the user checks whether the icon to be searched for is on a current screen; if the icon to be searched for is on the current screen, the user directly taps the icon to access the application; if the icon to be searched for is not on the current screen, the user first determines a type of the icon to be searched for (that is, "Calculator"), such as a "Tool" type, and then may directly perform a search in a row corresponding to icons of the "Tool" type by switching pages, for example, as shown in FIG. 4A, in the third row, one icon is moved leftward, and locations of icons in other rows remain unchanged, so that the "Calculator" icon can be found. Certainly, if the icon type to be searched for by the user is not on the current screen, for example, the icon to be searched for is "Browser", the user may perform a search by flicking up/down. As shown in FIG. 4B, icons of all types may be moved up by one row so that the "Browser" icon can be found.

Figure 5A:
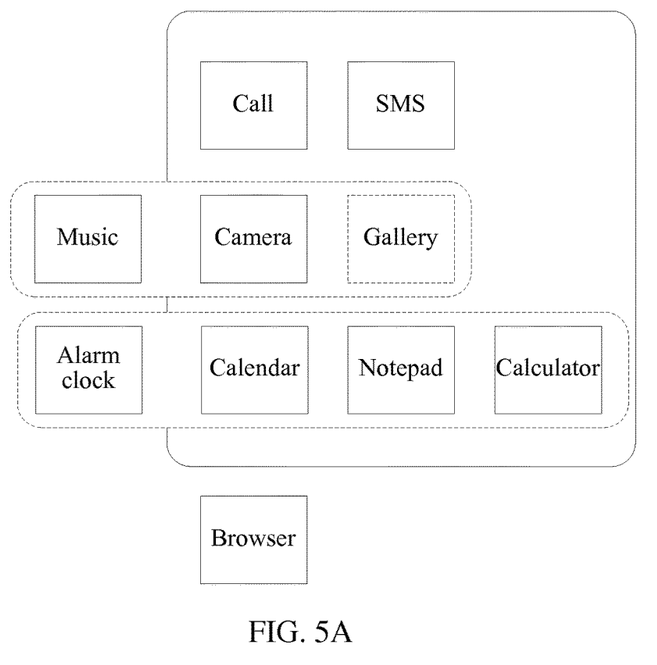
FIG. 5A is a schematic diagram of moving an icon leftward/rightward in a multi-touch manner in an icon sorting and displaying method according to an embodiment of the present invention.
Figure 5B:
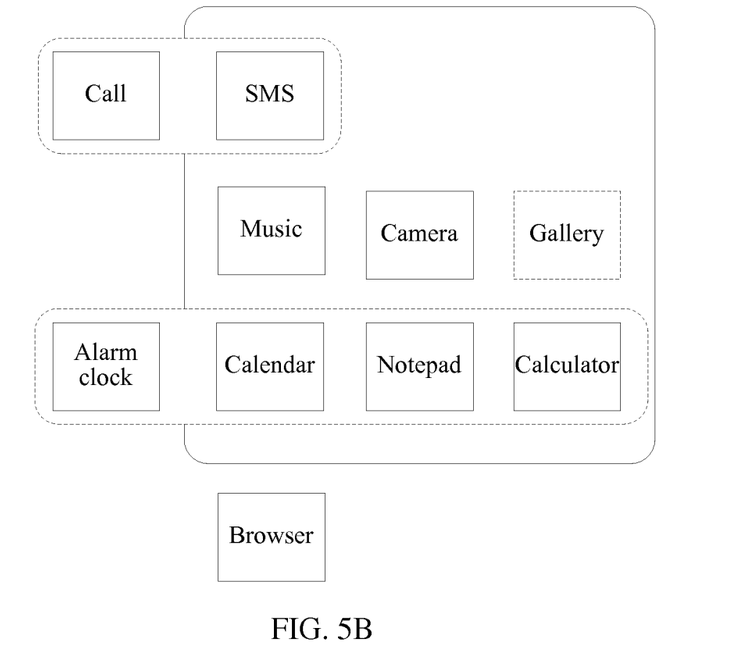
FIG. 5B is another schematic diagram of moving an icon leftward/rightward in a multi-touch manner in an icon sorting and displaying method according to an embodiment of the present invention.

The foregoing description is specific to a single-touch scenario. Certainly, this embodiment of the present invention is also applicable to a multi-touch scenario. Specifically, if a multi-touch operation is to flick only in an up/down direction and multi-touch directions are consistent, icons on an entire screen are scrolled up/down, which is the same as the single-touch scenario; if the multi-touch operation is to flick only in the up/down direction but the multi-touch directions are inconsistent, the screen remains still; and, if the multi-touch operation is to flick only in a left/right direction, icons in the rows in which the touch point is located moves leftward/rightward correspondingly at the same time and refreshed, and icons in other rows remain unchanged. When multi-touch directions are inconsistent in a same row, the screen remains still. FIG. 5A is an effect diagram of moving rows 2 and 3 leftward by one icon in a multi-touch scenario, and FIG. 5B is an effect diagram of moving rows 1 and 3 leftward by one icon in a multi-touch scenario. As shown in FIG. 5A, row 2 and row 3 have touch points at the same time, and the touch points move leftward at the same time; and, as shown in FIG. 5B, both row 1 and row 3 have touch points at the same time, and the touch points move leftward at the same time. In addition, if an up/down and left/right flicks occur at the same time, it may be set that the left/right direction takes precedence. Certainly, it may also be set that the up/down direction takes precedence.

The icon sorting and displaying method provided in this embodiment supports the touch control function, including single-touch or multi-touch or both, which may further facilitates input operations of a user and improves user experience.

Multi-touch is preferably be used in this embodiment of the present invention because the multi-touch has the following advantages: First, if icons are categorized by a system, and a user is unsure about a type to which an icon to be searched for belongs, or if icons are categorized by a user but the user forgets a type to which an icon to be searched for belongs, the user can flick multiple rows corresponding to multiple similar types to switch pages and perform a search; second, if icons of a specific type are excessive that they automatically occupies a next row, refreshing the rows simultaneously in a multi-touch manner facilitates searching by a user.

In a icon sorting and displaying method according to this embodiment of the present invention, not only application icons can be sorted both by type and by frequency of use, but also single-touch or multi-touch or both is supported to refresh icons across pages, which enables a more convenient and faster search for an icon.

Embodiment 3

On the basis of Embodiment 2, this embodiment adds a function to support a three-dimensional effect (3D effect) display of icons when they are moved. In this case, an icon sorting and displaying method provided in this embodiment may include all steps in Embodiment 2, and the method provided in this embodiment may further additionally include:

arranging all icons in a determined touch control area into a cyclic queue by making them adjacent to each other, where the cyclic queue is formed of icons, and the icons in the cyclic queue are adjacent in tandem, and the first icon is adjacent to the last icon to form a cycle.

In this case, the moving icons according to the determined touch control area or flick direction or both in Embodiment 2 may include:

moving the icons in the cyclic queue by means of a three-dimensional rotation effect according to the determined touch control area or flick direction or both.

In this way, after the user enters an icon window, the user rotates the icons in the cyclic queue by means of touch input, and stops rotating when an icon is found, which may add an ornamental value and fun.

Further, the three-dimensional effect provided in the embodiment of the present invention may include a three-dimensional display effect of rotating icons in one or more rows, and a three-dimensional display effect of the entire icon display space.

The following describes a three-dimensional effect of rotating a single row of icons in detail by using an example in which a cyclic queue is a revolving bookshelf, and the three-dimensional effect of rotating multiple rows of icons may be obtained in a similar way.

The entire icon screen space is designed as a revolving bookshelf. The revolving bookshelf includes multiple revolving icon layers, and each revolving icon layer accommodates icons of a same type. When a touch input operation is performed on an icon in the revolving icon layer, the icon moves in a revolving manner. When a specific type of icon is large in quantity and may occupy multiple revolving icon layers, two or more revolving icon layers may accommodate the same type of icon. A location of an icon in a revolving icon layer is dynamically adjusted by frequency of use. Whenever the revolving bookshelf is viewed, the most frequently used icons are displayed. During operation, a rotor on the revolving icon layer is touched to rotate, and the rotor stops rotating when the icon to be searched for is viewed. A reset button may be disposed on each revolving icon layer, and pressing the reset button may lead to rotating back to an initial state. In addition, an entire-screen reset button may be disposed on each revolving icon layer, and pressing the entire-screen reset button may restore all icons to their initial states. In this case, upper-layer and lower-layer movements and leftward and rightward rotations on each layer can be seen.

The following gives specific description about the three-dimensional effect of the entire icon display space.

In this embodiment of the present invention, an icon page screen is three-dimensional space like a magic cube. For example, the screen may have six sides, and each side is divided into 4×4 panes. In this way, 16 icons can be displayed on each side, and 16 icons can be displayed in one row of transverse sides. In addition, each row may be set to be a type of icon. To select a specific icon of this type, the user may rotate this row. For icons that exceed a display location, "Next Page" may be displayed in a location of the 16th icon, and then the rotation may continue.

In addition, for a type that has few icons, different types of icons may be displayed by four in a same row of different sides.

In a icon sorting and displaying method according to this embodiment, not only application icons can be sorted both by type and by frequency of use, but also visual area division is more intuitive and clear, which enhances user experience.

It should be pointed out that Embodiment 2 and Embodiment 3 enumerated above omit a part that is the same as that of Embodiment 1 for a purpose of highlighting a difference. In addition, it should be understood that technical characteristics described in one embodiment may be partly or fully included into other embodiments, or all embodiments may be combined into a new embodiment. For example, in an embodiment of the icon sorting and displaying method provided in the present invention, not only application icons can be sorted both by type and by frequency of use, and but also a three-dimensional display effect and a multi-touch control function are supported at the same time.

Figure 6A:
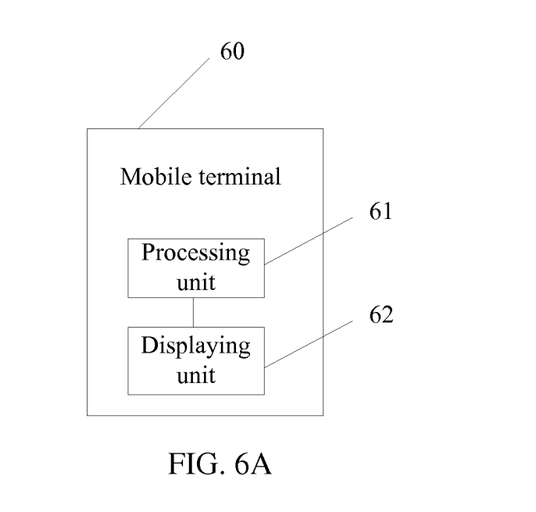
FIG. 6A is a structural block diagram of a terminal device according to an embodiment of the present invention.

Corresponding to the foregoing method, an embodiment of the present invention further provides a terminal device. FIG. 6A is a structural block diagram of a terminal device 60 according to an embodiment of the present invention. As shown in FIG. 6A, the terminal device 60 (e.g., a mobile terminal) includes a processing unit 61 and a displaying unit 62, where:

the processing unit 61 is configured to sort icons by type along a first direction, and sort icons of a same type by frequency of use along a second direction; and the displaying unit 62 is configured to display on a screen the icons sorted by the processing unit 61.

The terminal device provided in this embodiment of the present invention sorts icons by type along a first direction, and sorts icons of a same type by frequency of use along a second direction, so that the icons can be separately sorted in two different directions, which is equivalent to two search clues. In this way, the icons can be searched for in one direction by type, and at the same time the icons of the same type can be searched for in another direction by frequency of use. In this way, the two aspects are performed at the same time, thereby simplifying user operations of searching for and selecting an icon and enabling a user to find a frequently used icon more quickly.

Figure 6B:
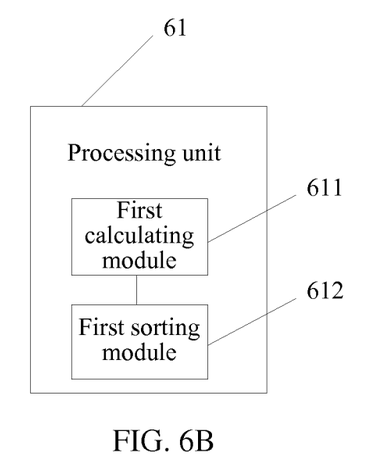
FIG. 6B is a structural block diagram of a processing unit in a terminal device shown in FIG. 6A.

In an embodiment of the present invention, as shown in FIG. 6B, the processing unit 61 may include:

a first calculating module 611, configured to calculate a value of frequency of use of each icon of a same type; and a first sorting module 612, configured to sort each icon of the same type according to the calculated value of frequency of use along the second direction.

The first calculating module 611 may be configured to:

record the number of times of using each icon of the same type and duration of use each time; and calculate the value of frequency of use of each icon according to the recorded number of times of use and duration of use each time.

Figure 6C:
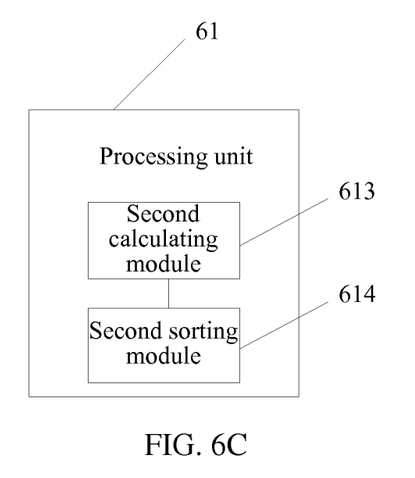
FIG. 6C is another structural block diagram of a processing unit in a terminal device shown in FIG. 6A.

In another embodiment of the present invention, as shown in FIG. 6C, the processing unit 61 may include:

a second calculating module 613, configured to calculate an overall frequency value of each type of icon; and a second sorting module 614, configured to sort each type of icon according to the overall frequency value along the first direction.

The second calculating module 613 may be configured to:

determine the number of icons of a same type and a value of frequency of use of each icon; and calculate the overall frequency value of each type of icon according to the determined number of icons and the value of frequency of use of each icon.

Figure 7:
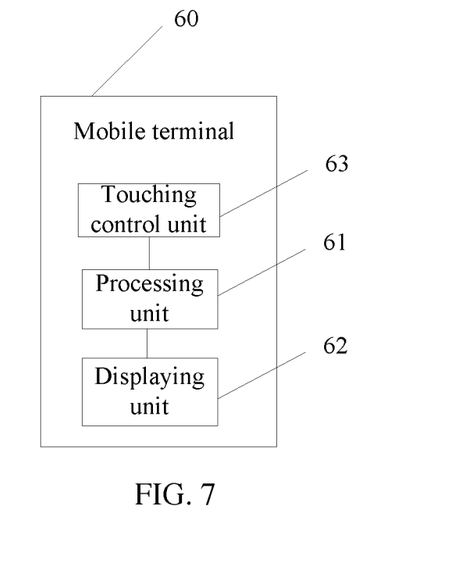
FIG. 7 is another structural block diagram of a terminal device according to an embodiment of the present invention.

Further, as shown in FIG. 7, the terminal device 60 (e.g., a mobile terminal) may further include:

a touch control unit 63, configured to divide a display area of the screen into multiple independent touch control areas according to icon types, receive a touch input of a user, determine a touch control area and a flick direction that are corresponding to the touch input, and move icons according to the determined touch control area or flick direction or both, where:

move the icons successively along the first direction when the flick direction is the first direction; and move, when the flick direction is the second direction, the icons of the type to which the determined touch control area belongs successively along the second direction and at the same time keep other types of icons unchanged.

The touch input of the user is a single-touch input or a multi-touch input.

In an embodiment, further, the touch control unit 63 is further configured to: arrange all icons in the determined touch control area into a cyclic queue by making them adjacent to each other; and move the icons in the cyclic queue by means of a three-dimensional rotation effect according to the determined touch control area or flick direction or both. Specifically, the entire icon screen space may be designed as a revolving bookshelf. The revolving bookshelf includes multiple revolving icon layers, and each revolving icon layer accommodates icons of a same type. When a touch input operation is performed on an icon in the revolving icon layer, the icon moves in a revolving manner.

In another embodiment, the touch control unit 63 is further configured to receive a reset instruction input by the user; and the processing unit 61 is configured to reset the icons according to the reset instruction received by the touch control unit 63, where the reset instruction includes a type reset instruction that is used to reset one type of icon, and an entire-screen reset instruction that is used to reset all the icons.

Specifically, when receiving a type reset instruction input by the user, the touch control unit 63 resets all icons of the type specified in the type reset instruction; and, when receiving an entire-screen reset instruction input by the user, the touch control unit 63 resets all icons on the screen.

It should be pointed out that the terminal device provided in this embodiment of the present invention corresponds to the icon sorting and displaying method described herein. Because the method has been described in detail above, reference may be made to the foregoing method embodiment and related content is not repeated here.

It is noteworthy that each unit included in the foregoing terminal device embodiment is merely disposed according to functional logics but is not limited to the disposition, and any disposition is appropriate only if the corresponding functions can be implemented. In addition, a specific name of each function unit is for mutual differentiation only instead of limiting the protection scope of the present invention.

A person of ordinary skill in the art may understand that all or a part of the steps of methods in the foregoing embodiments may be implemented by a program instructing relevant hardware. The program may be stored in a computer readable storage medium, where the storage medium may be a read-only memory, a magnetic disk, or an optical disc or the like.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention is subject to the protection scope of the claims.

What is claimed is:

1. An icon sorting and displaying method, comprising:
performing a first sorting of icons by type along a first direction;
performing a second sorting of icons belonging to a same type by frequency of use along a second direction, among the icons sorted according to the first sorting; and
displaying the icons sorted according to the second sorting on a screen,
wherein the performing the second sorting comprises:
calculating a value of frequency of use of each icon belonging to the same type, and
sorting each icon belonging to the same type according to the value of frequency of use of each icon belonging to the same type along the second direction,
wherein the calculating the value of frequency of use of each icon belonging to the same type comprises:
recording a number of times of using each icon belonging to the same type within a preset time and recording a duration of use each time, and
for a first icon among a first plurality of icons belonging to the same type, calculating a value of frequency of use of the first icon according to a product of a first weight with a number of times of using the first icon, divided by a number of times of using the first plurality of icons, and summed with a product of a second weight with a duration of using the first icon, divided by a duration of using the first plurality of icons,
wherein a sum of the first weight and the second weight is equal to one.

2. The method according to claim 1, wherein the sorting of each icon belonging to the same type according to the value of frequency of use of each icon belonging to the same type along the second direction comprises:
arranging each icon of the same type in a left to right ascending order of the value of frequency of use of each icon belonging to the same type.

3. The method according to claim 1, wherein the performing the first sorting comprises:
calculating an overall frequency value of each type of icon; and
sorting each type of icon according to the overall frequency value of each type of icon along the first direction.

4. The method according to claim 3, wherein the calculating the overall frequency value of each type of icon comprises:
recording a number of icons of a same type and recording a value of frequency of use of each icon; and
calculating the overall frequency value of each type of icon along the first direction according to the number of icons and according to the value of frequency of use of each icon.

5. The method according to claim 1, wherein the method further comprises:
dividing a display area of the screen into multiple independent touch control areas according to icon types;
receiving a touch input of a user;
determining a touch control area and a flick direction that are corresponding to the touch input of the user;
moving one or more of the icons according to at least one of the touch control area and the flick direction;
moving the one or more icons successively along the first direction when the flick direction is the first direction; and
moving, when the flick direction is the second direction, one or more icons of the type to which the touch control area belongs successively along the second direction and at a same time keeping other types of icons unchanged.

6. The method according to claim 5, wherein the method further comprises:
arranging all icons in the touch control area into a cyclic queue by making each icon of all the icons in the touch control area adjacent to at least one other icon; and
the moving icons according to the at least one of the touch control area and the flick direction comprises:
moving one or more of the icons in the cyclic queue by a three-dimensional rotation effect according to the at least one of the touch control area and the flick direction.

7. The method according to claim 6, wherein the method further comprises:
receiving a reset instruction input by the user; and
resetting one or more of the icons according to the reset instruction, wherein
the reset instruction comprises a type reset instruction that is used to reset one type of icon, and an entire-screen reset instruction that is used to reset all the icons.

8. A terminal device, comprising:
at least one processor, configured to perform a first sorting of icons by type along a first direction, and to perform a second sorting of icons belonging to a same type by frequency of use along a second direction, among the icons sorted according to the first sorting; and
a display, configured to display on a screen the icons sorted according to the second sorting,
wherein the at least one processor is further configured to:
calculate a value of frequency of use of each icon belonging to the same type, and
sort each icon belonging to the same type according to the value of frequency of use of each icon belonging to the same type along the second direction,
wherein, to calculate the value of frequency of use of each icon belonging to the same type, the at least one processor is further configured to:
record a number of times of using each icon belonging to the same type within a preset time and record a duration of use each time, and
for a first icon among a first plurality of icons belonging to the same type, calculate a value of frequency of use of the first icon according to a product of a first weight with a number of times of using the first icon, divided by a number of times of using the first plurality of icons, and summed with a product of a second weight with a duration of using the first icon, divided by a duration of using the first plurality of icons,
wherein a sum of the first weight and the second weight is equal to one.

9. The terminal device according to claim 8, wherein the at least one processor is further configured to:
arrange each icon of the same type in a left to right ascending order of the value of frequency of use of each icon belonging to the same type.

10. The terminal device according to claim 8, wherein the at least one processor is further configured to calculate an overall frequency value of each type of icon, and to sort each type of icon according to the overall frequency value of each type of icon along the first direction.

11. The terminal device according to claim 10, wherein the at least one processor is further configured to:
record a number of icons of a same type and record a value of frequency of use of each icon; and
calculate the overall frequency value of each type of icon along the first direction according to the number of icons and according to the value of frequency of use of each icon.

12. The terminal device according to claim 8, wherein the terminal device further comprises:
a touch controller, configured to divide a display area of the screen into multiple independent touch control areas according to icon types, receive a touch input of a user, determine a touch control area and a flick direction that are corresponding to the touch input of the user, and move one or more icons according to at least one of the touch control area and the flick direction, wherein:
the touch controller is further configured to move one or more icons successively along the first direction when the flick direction is the first direction, and to move, when the flick direction is the second direction, one or more icons of the type to which the touch control area belongs successively along the second direction and at a same time keep other types of icons unchanged.

13. The terminal device according to claim 11, wherein the touch controller is further configured to:
arrange all icons in the touch control area into a cyclic queue by making each icon of all the icons in the touch control area adjacent to at least one other icon; and
move one or more of the icons in the cyclic queue by a three-dimensional rotation effect according to the at least one of the touch control area and the flick direction.

14. The terminal device according to claim 13, wherein:
the touch controller is further configured to receive a reset instruction input by the user; and
the at least one processor is further configured to reset one or more of the icons according to the reset instruction, wherein
the reset instruction comprises a type reset instruction that is used to reset one type of icon, and an entire-screen reset instruction that is used to reset all the icons.

* * * * *